(12) United States Patent
Brown

(10) Patent No.: US 6,619,722 B1
(45) Date of Patent: Sep. 16, 2003

(54) CONVERTIBLE BOOT FASTENER

(75) Inventor: Michael Brown, Davison, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/310,732

(22) Filed: Dec. 5, 2002

(51) Int. Cl.⁷ .................................................. B60J 7/20
(52) U.S. Cl. .................................. 296/136; 296/107.08
(58) Field of Search .......................... 296/107.08, 136, 296/107.11, 121

(56) References Cited

U.S. PATENT DOCUMENTS

| | | | |
|---|---|---|---|
| 3,222,103 A | * 12/1965 | Wernig et al. | 296/136 |
| 3,332,717 A | * 7/1967 | Amesbury | 296/136 |
| 3,510,165 A | * 5/1970 | Adams | 296/136 |
| 4,930,833 A | * 6/1990 | Cichoski et al. | 296/136 |
| 4,998,766 A | * 3/1991 | Biermacher et al. | 296/136 |
| 5,322,337 A | * 6/1994 | Rawlings et al. | 296/136 |

OTHER PUBLICATIONS

"Plastics Handbook", edited by Modern Plastics, 1994, pp. 153 and 154.*

* cited by examiner

Primary Examiner—Stephen T. Gordon
Assistant Examiner—Jason Morrow
(74) Attorney, Agent, or Firm—Marc J. Luddy

(57) ABSTRACT

A snap connector for coupling a convertible boot arm to a quarter trim panel including an edge flange. According to an example embodiment, the snap connector includes a substantially C-shaped element coupled to the convertible boot arm that is adapted to snap fit over the edge flange of the quarter trim panel. The snap connector may include a flexible detent element that may distend over the edge flange during an installation of the snap connector over the edge flange, and upon installation, may extend over the flange to removably adjoin the snap connector to the edge flange.

4 Claims, 3 Drawing Sheets

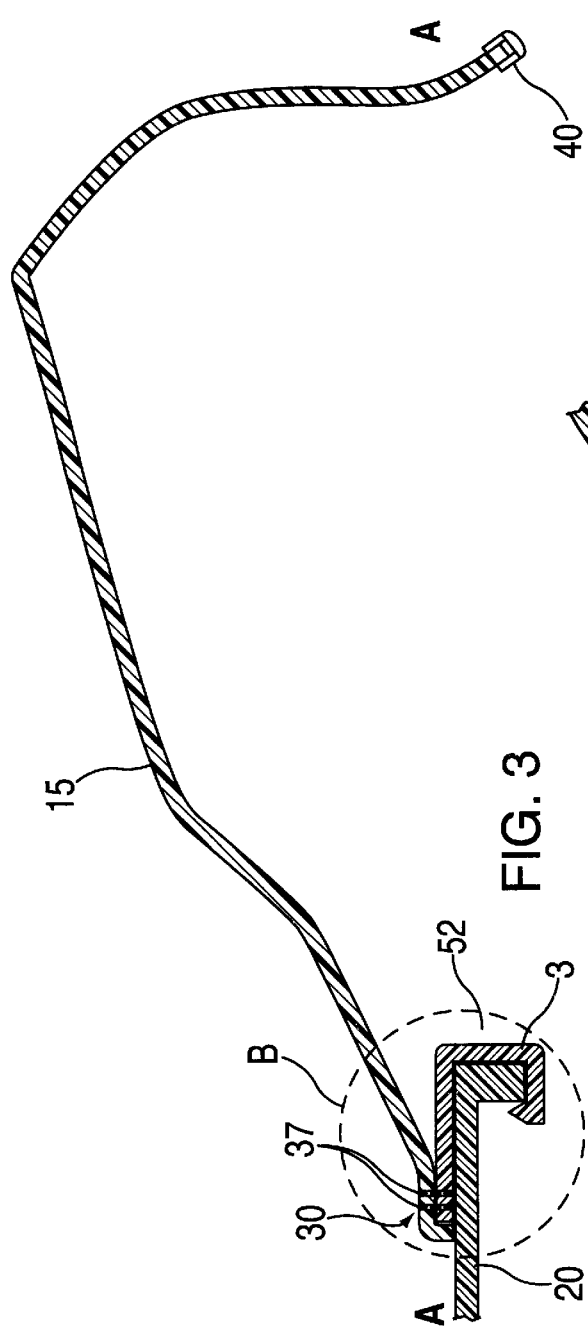
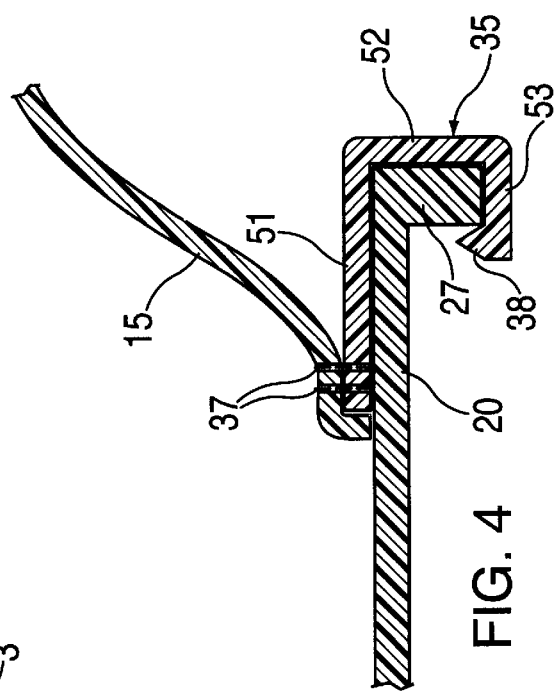
FIG. 3
FIG. 4

CONVERTIBLE BOOT FASTENER

FIELD OF THE INVENTION

The present invention relates generally to boots used as coverings in convertible vehicles. More particularly, the present invention relates to a convertible boot fastener tab.

BACKGROUND INFORMATION

FIG. 1 shows an example boot covering 10 installed in a convertible vehicle when the roof is down to cover numerous parts and fixtures that would otherwise be directly exposed. The boot 10 includes boot arm sections 15 on the left and right sides (of which only the left is shown) that extend along the sides of the vehicle moldings. The boot arms 15 are normally attached to quarter trim panel adjacent the side doors. FIGS. 2a and 2b show two different conventional fastening fixtures 23, 24 used in attaching boot arms to the respective quarter trim panels 20. One of the disadvantages of applying such fasteners 23, 24 to the quarter trim panel is that they are directly exposed and detract from the appearance of the interior of the vehicle. Another disadvantage with the conventional fasteners 23, 24 is that they are usually made of steel and are subject to corrosion. Additionally, such fasteners are relatively expensive to produce and install.

It is therefore an object of the present invention to provide a concealed, inexpensive boot fastener that is not subject to corrosion and also functions to support the boot arm and prevent boot detachment.

SUMMARY

The above and other beneficial objects of the present invention are most effectively attained by providing a snap connector for coupling a convertible boot arm to a quarter trim panel including an edge flange as described herein. According to an example embodiment, the snap connector includes a substantially C-shaped element coupled to the convertible boot arm that is adapted to snap fit over the edge flange of the quarter trim panel. The snap connector may include a flexible detent element that may distend over the edge flange during an installation of the snap connector over the edge flange, and upon installation, may extend over the flange to removably adjoin the snap connector to the edge flange.

BRIEF DESCRIPTION OF THE DRAWINGS

FIG. 3 is cross-section of a boot arm taken along line A—A in FIG. 1 illustrating an example embodiment of a boot fastener according to the present invention; and FIG. 4 is an enlarged view of section B of FIG. 3 including the example embodiment of the boot fastener according to the present invention.

DETAILED DESCRIPTION

Figure 1:
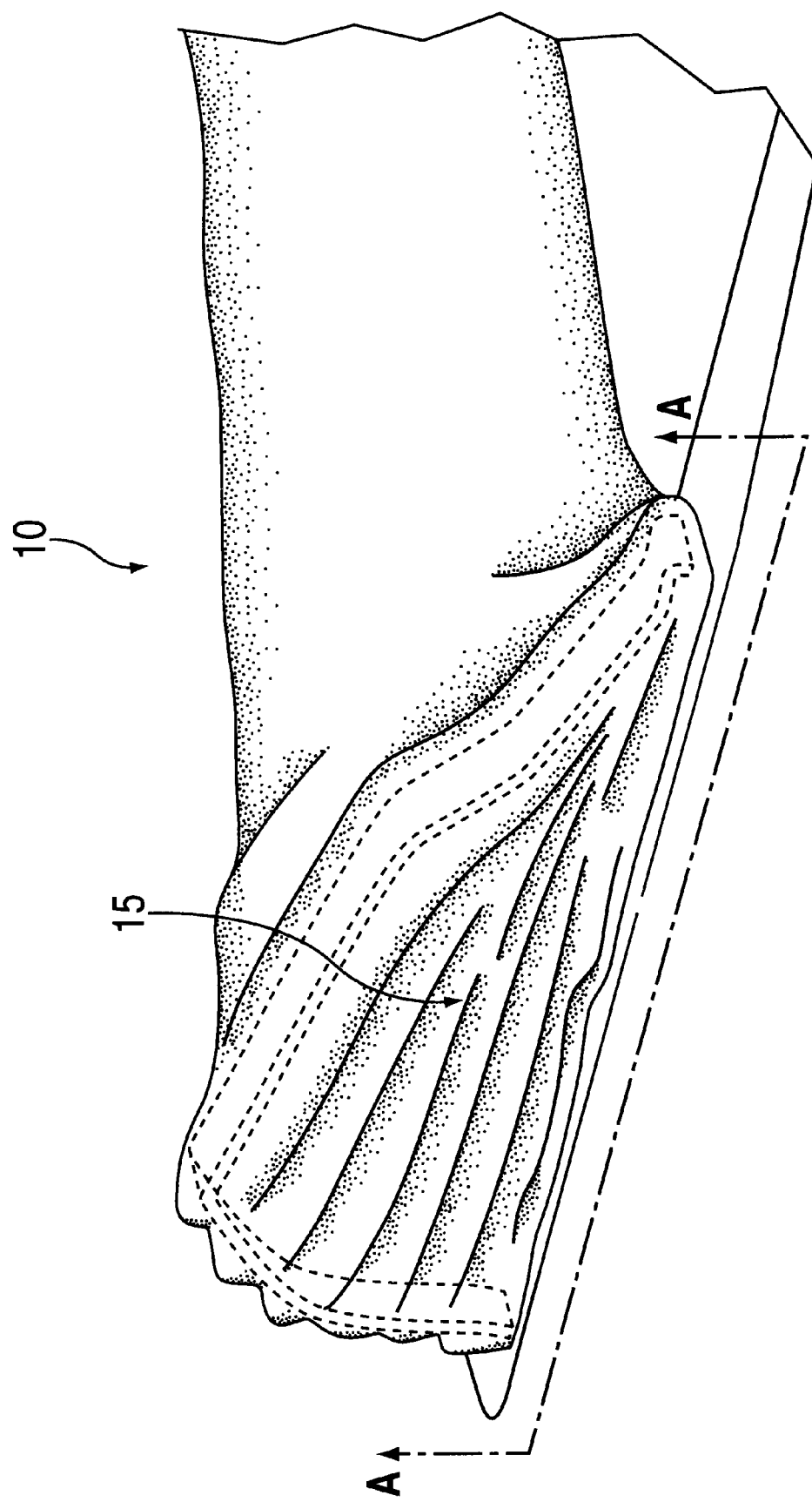
FIG. 1 is a perspective view of a conventional convertible boot.
Figure 2B:
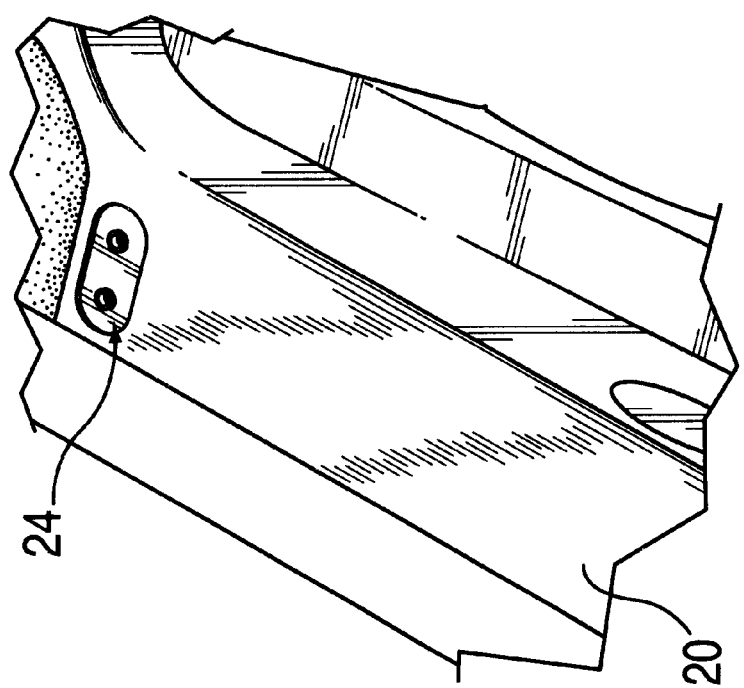
FIG. 2b shows a second conventional boot fastener attached to a quarter trim panel.
Figure 2A:
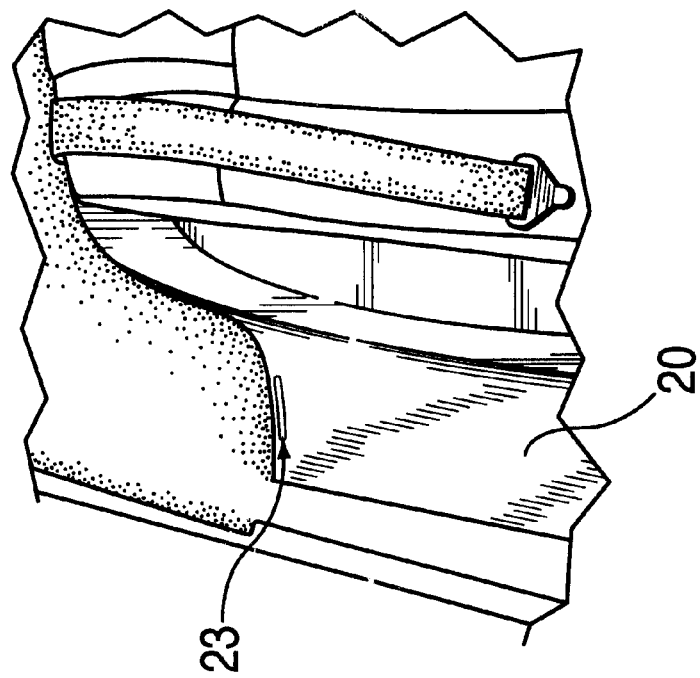
FIG. 2a shows a first conventional boot fastener attached to a quarter trim panel.

Those skilled in the art will gain an appreciation of the present invention from a reading of the following description when viewed in conjunction with the accompanying drawings of FIGS. 1 to 4, inclusive. The individual reference characters designate the same or similar elements throughout the several views.

Referring now to FIG. 3, there is shown a cross-section of a boot arm taken along line A—A of FIG. 1. The boot arm 15 which slopes upwardly from a first fastening arrangement 30 at the quarter trim panel, toward an apex, and then slopes downward toward a second fastening arrangement 40. The boot arm 15 (and the boot 10 as a whole) may be composed of a plastic or fabric material and may have a thickness of approximately 3 to 4 mm. FIG. 4 shows an enlarged view of section B of FIG. 3 which includes the fastening arrangement 30. As shown, the leading edge of the boot arm 15 is permanently fastened, by stitches 37, for example to a generally C-shaped snap connector 35. The snap connector 35 may be made from extruded plastic, which material has a degree of elastic flexibility. The snap connector 35 includes an upper portion 51 to which the boot arm 15 is stitched, a side portion 52 and a lower portion 53. The lower portion 53 includes a flexible detent element 38 which extends upwardly from the end of the lower portion. The snap connector 35 may be fitted over onto a downwardly extending edge flange 27 normally molded onto the edge of the quarter trim panel 20 when the detent 38 is first distended and then snaps over the back of the edge flange. The upper portion 51 of the snap connector slides over the top of the quarter trim panel, which the lower portion 53 snaps over the flange 27 with the detent element 38 providing a snap-fit connection and preventing the snap connector from sliding off of the quarter trim panel 20. Using the snap fastener 30 according to the present invention, a boot may be respectively engaged or disengaged from the quarter trim panel 20 simply by pushing the boot arms 15 forward to establish a snap-fit connection and pulling the boot arms backward with enough force to pull the detent 38 backwardly to release the connector 35.

According to an example embodiment, the snap connector 35 may be approximately 16 to 18 mm long (on its longer upper portion 51) and may be approximately 2 mm thick. It is noted that the snap connector may also have a degree of depth (the dimension into the page) to cover the entire span of the quarter trim panel flange 27.

The boot arm fastening arrangement of the present invention may eliminate the need for quarter trim panel fasteners, improving the appearance of the quarter trim panel when the boot is not installed. The snap connector may be stitched directly to the boot without the need for additional reinforcements or additional backing. As the connector is made from plastic it may also not be susceptible to corrosion. The extra connector part may also be relatively inexpensive and easy to produce.

Thus, the several aforementioned objects and advantages of the present invention are most effectively attained. Those skilled in the art will appreciated that many modifications of the example embodiments described hereinabove may be made without departing from the spirit and scope of the present invention. Although several example embodiments of the present invention have been described and disclosed in detail herein, it should be understood that this invention is in no sense limited thereby and that its scope is to be determined by that of the appended claims.

What is claimed is:

1. A snap connector for coupling a convertible boot arm to a quarter trim panel having a downwardly extending edge flange, said snap connector, comprising:

an upper portion configured to fit flush on said quarter trim panel, said upper portion having a connection to said convertible boot arm at one end;

a side portion configured to fit flush against said downwardly extending edge flange, said side portion having a connection to said upper portion at a point opposite said upper portion's connection to said convertible boot arm;

a lower portion configured to fit flush to said downwardly extending edge flange, said lower portion having a connection to said side portion at a point opposite said side portion's connection to said upper portion; and a detent element positioned on said lower portion at a point opposite said lower portion's connection to said side portion.

2. The snap connector of claim 1, where said a flexible detent element distends over said downwardly extending edge flange during installation of said snap connector to removably adjoin said snap connector to said quarter trim panel.

3. The snap connector of claim 1, where said snap connector is coupled to said convertible boot arm with at least one stitch.

4. The snap connector of claim 2, where said snap connector is made from an elastic material.

* * * * *